April 29, 1924.  
H. B. HENDERSON  
TRACK CONSTRUCTION  
Filed May 18, 1923  
1,492,458  
3 Sheets—Sheet 1
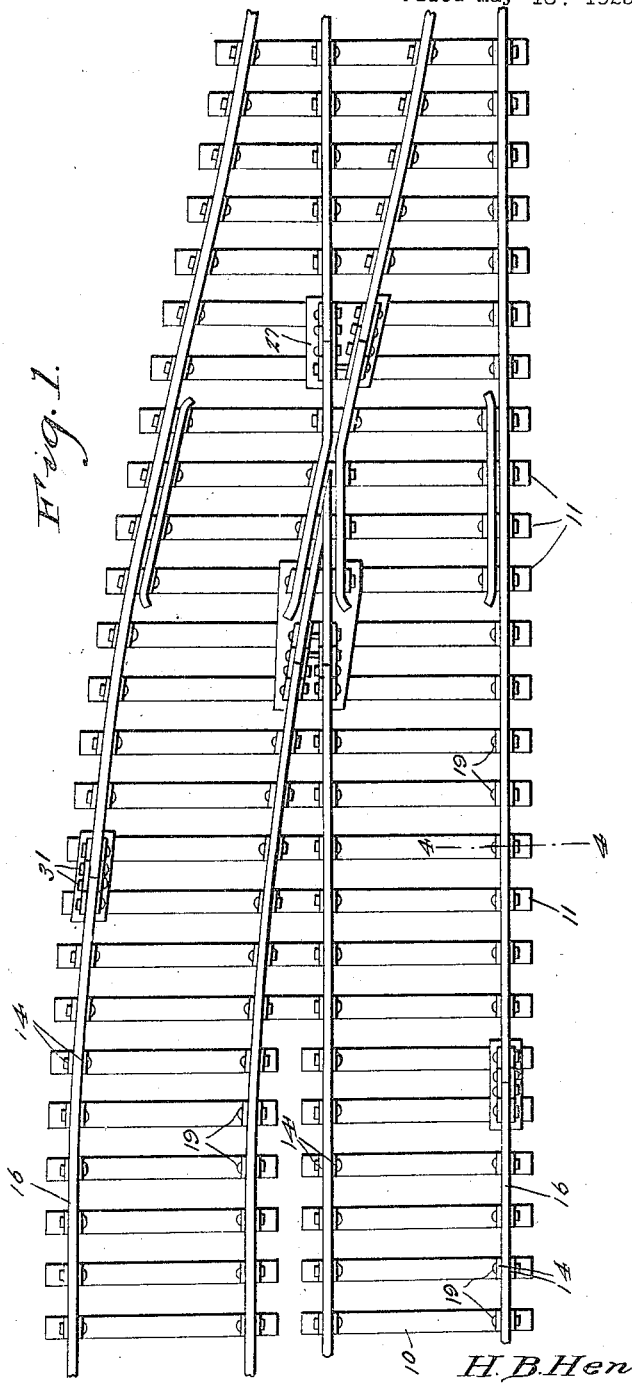
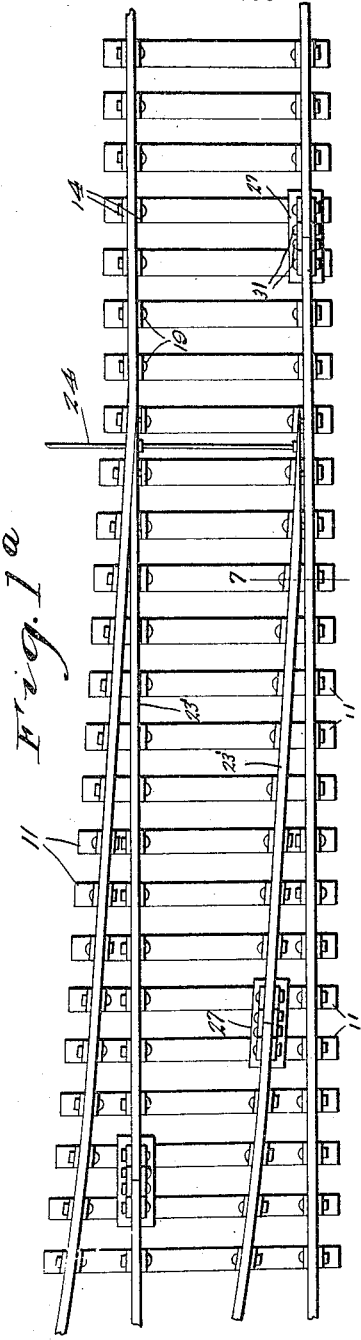
INVENTOR  
H. B. Henderson  
BY Victor J. Evans  
ATTORNEY
WITNESSES April 29, 1924.
H. B. HENDERSON
TRACK CONSTRUCTION
Filed May 18, 1923      3 Sheets-Sheet 2
1,492,458
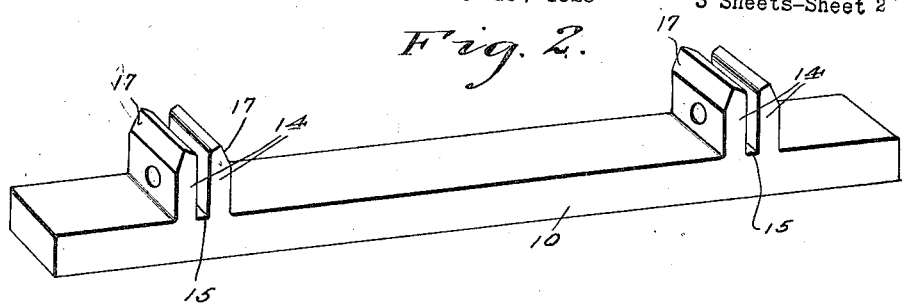
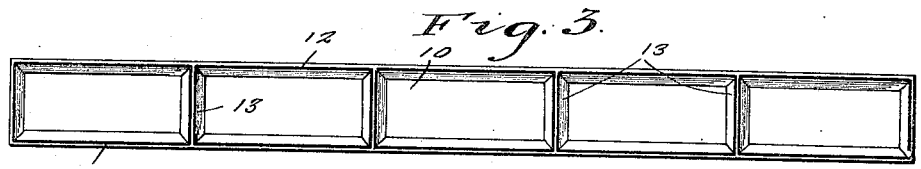
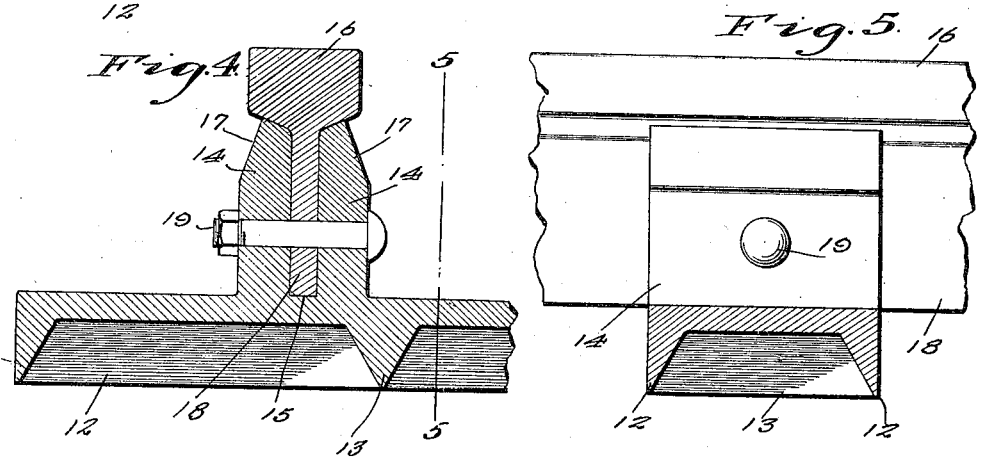
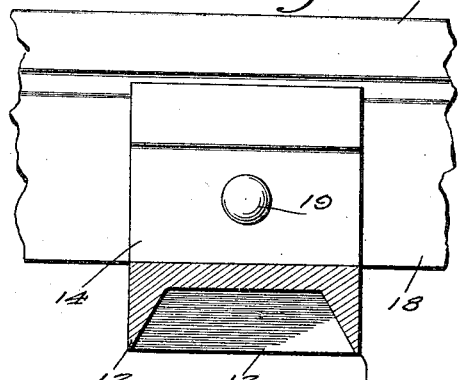
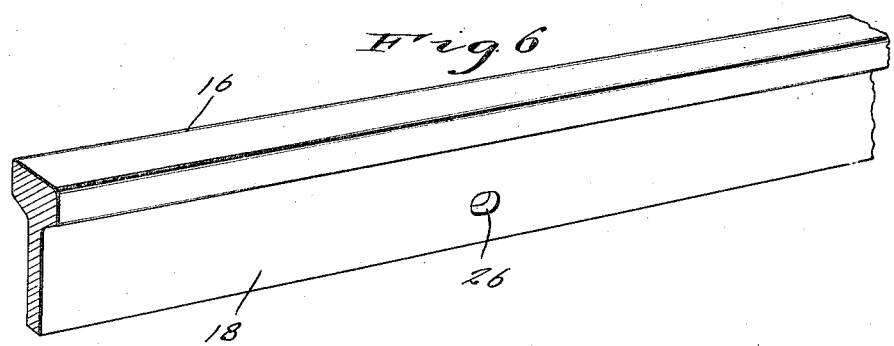

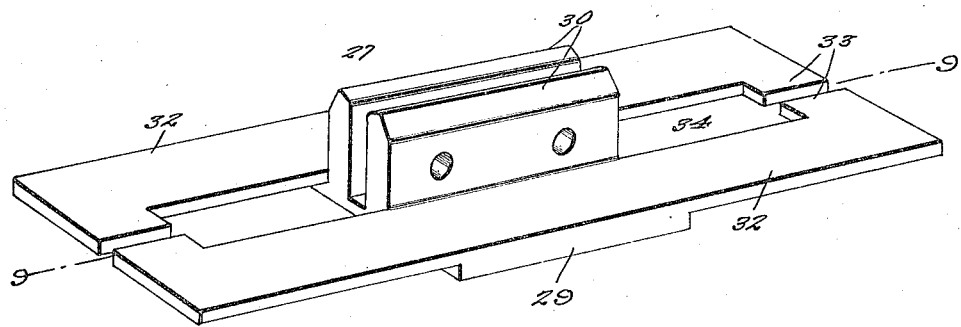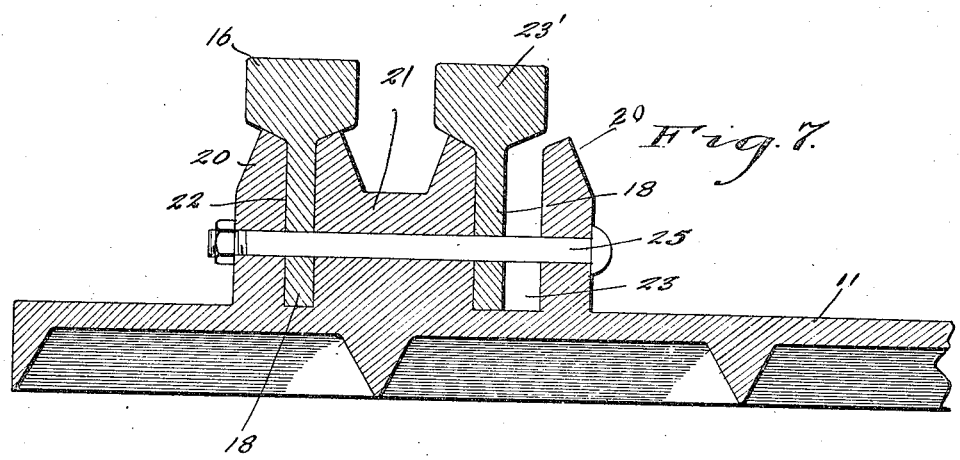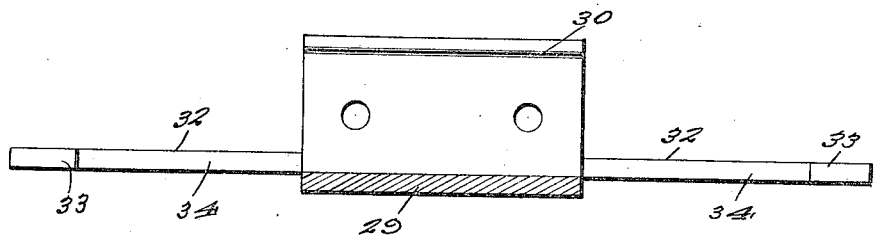

Patented Apr. 29, 1924.

1,492,458

UNITED STATES PATENT OFFICE.

HENRY B. HENDERSON, OF ARGYLE, GEORGIA.

TRACK CONSTRUCTION.

Application filed May 16, 1923. Serial No. 639,982.

*To all whom it may concern:*

Be it known that I, HENRY B. HENDERSON, a citizen of the United States, residing at Argyle, in the county of Clinch and State of Georgia, have invented new and useful Improvements in Track Constructions, of which the following is a specification.

This invention relates to new and useful improvements in track construction and has for an object the provision of novel means for supporting and fastening rails to cross ties.

Another object of the invention is the provision of means especially adapted for use with the track construction above mentioned, for securing the adjacent ends of the rails in place.

Another object of the invention is the provision of a track construction which includes means for securing switch rails or frogs as well as straight rails.

With the above and other objects in view, the invention further includes the following novel features and details of construction, to be hereinafter more fully described, illustrated in the accompanying drawings and pointed out in the appended claims.

In the drawings:—

Figure 1 is a plan view of a portion of a railroad track construction showing a portion of a main track and siding.

Figure 1ª is a similar view showing a continuation of the track at the right hand end of Figure 1.

Figure 2 is an enlarged detail perspective view of one of the cross ties.

Figure 3 is a bottom plan view of the same.

Figure 4 is an enlarged sectional view on the line 4—4 of Figure 1.

Figure 5 is a sectional view on the line 5—5 of Figure 4.

Figure 6 is a fragmentary perspective view showing a portion of one of the rails.

Figure 7 is an enlarged sectional view on the line 7—7 of Figure 1ª.

Figure 8 is a detail perspective view of a rail joint for connecting the meeting ends of the rails.

Figure 9 is a section on the line 9—9 of Figure 8.

Referring in detail to the drawings, Figures 1 and 1ª illustrate in plan view the track construction which includes cross ties 10 and 11, the former being used with straight rails while the latter are used at switches.

One of the ties 10 is illustrated in detail in Figure 2 of the drawings and is preferably formed of metal with its under face hollowed out and provided with marginal ribs 12 and cross ribs 13. These ribs are adapted to embed themselves in the road bed and act to hold the tie in proper position.

Extending upward from and formed integral with the ties 11 near each end thereof are pairs of spaced rail plates 14, which define grooves 15, the upper edges of these plates being beveled and abutting the under face of the heads 16 of the rails, the said plates being also beveled as at 17 to provide for the passage of the flanges of the car wheels.

The rails are provided with downwardly extending webs 18, but the usual base flanges are omitted. The webs 18 are received within the grooves 15 and are secured therein by means of bolts 19.

Some of the ties 11 are also provided with pairs of spaced plates 14, while some of the ties are provided with rail plates 20 which have between them filler blocks 21. These blocks are also preferably formed integral with the ties and engage beneath the heads 16 of the rails, and are so spaced from the rail plates 20 as to provide grooves 22 which fit against the opposite faces of the webs 18, and grooves 23. These last mentioned grooves are wider than the webs 18 and are adapted to receive within them the webs of the switch points 23′, so that proper movement of these points is permitted. The switch points may be operated by any suitable means connected to the rod 24 shown in Figure 1ª. The rails and switch points, together with the plates 20 and filler blocks 21 have extending therethrough a bolt 25 as shown in Figure 7, the opening in the web of the switch point 23′ being elongated as shown at 26 in Figure 6 so as to provide for the movement of the switch point.

For the purpose of connecting the meeting ends of the rails there is provided a plurality of rail joints 27, one of which is illustrated in detail in Figure 8. These rail joints each include a cross plate 29 which is adapted to be positioned between the ties and which has extending upwardly therefrom spaced connecting bars 30. These bars are secured to the adjacent ends of the rails by means of bolts 31. Extending from the cross plate 29 upon opposite sides of the rail is an anchor plate 32. These plates are substantially U-shaped in plan and are provided with inwardly extending portions 33, the space 34 between the anchor plates 32 providing for the passage of the rail plates 14 of adjacent ties. The inwardly extending portions 33 engage around the ends of these rail plates and act to securely hold the joint in position.

The invention is susceptible of various changes in its form, proportions and minor details of construction and the right is herein reserved to make such changes as properly fall within the scope of the appended claims.

Having described the invention what is claimed is:—

1. In a track construction, a plurality of ties, upwardly extending spaced rail plates adjacent each end of the ties and defining grooves, rails including a head and a downwardly extending web adapted to be positioned within the grooves, means for securing the rails in position, cross plates adapted to be positioned between the ties beneath the meeting ends of the rails, bars extending upwardly from the cross plate and connecting said rail ends and means extending from the cross plate and engaging the rail plates of adjacent ties.

2. In a track construction, a plurality of ties, upwardly extending spaced rail plates adjacent each end of the ties and defining grooves, rails including a head and a downwardly extending web adapted to be positioned within the grooves, means for securing the rails in position, cross plates adapted to be positioned between the ties beneath the meeting ends of the rails, bars extending upwardly from the cross plate and connecting said rail ends and means extending from the cross plate upon opposite sides of the rails and engaging the rail plates of adjacent ties.

3. In a track construction, a plurality of ties, upwardly extending spaced rail plates adjacent each end of the ties and defining grooves, rails including a head and a downwardly extending web adapted to be positioned within the grooves, means for securing the rails in position, cross plates adapted to be positioned between the ties beneath the meeting ends of the rails, bars extending upwardly from the cross plate and connecting said rail ends and opposed substantially U-shaped plates extending from the cross plate and engaging the rail plates of adjacent ties.

In testimony whereof I affix my signature.

HENRY B. HENDERSON.